United States Patent
Nayak

(10) Patent No.: US 11,074,824 B2
(45) Date of Patent: Jul. 27, 2021

(54) SMART DRIVE TESTING FOR MOBILE NETWORK AND RADIO FREQUENCY VERIFICATION

(71) Applicant: T-Mobile USA, Inc., Bellevue, WA (US)

(72) Inventor: Niraj Nayak, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 267 days.

(21) Appl. No.: 16/227,378

(22) Filed: Dec. 20, 2018

(65) Prior Publication Data

US 2020/0202730 A1 Jun. 25, 2020

(51) Int. Cl.
| | | |
|---|---|---|
| G08G 5/04 | (2006.01) | |
| G05D 1/10 | (2006.01) | |
| H04B 17/309 | (2015.01) | |
| G08G 5/00 | (2006.01) | |

(52) U.S. Cl.
CPC ............. *G08G 5/045* (2013.01); *G05D 1/101* (2013.01); *G08G 5/0008* (2013.01); *G08G 5/0069* (2013.01); *H04B 17/309* (2015.01)

(58) Field of Classification Search
None
See application file for complete search history.

(56) References Cited

U.S. PATENT DOCUMENTS

| | | | | |
|---|---|---|---|---|
| 9,085,363 B2* | 7/2015 | Tofte | ............... | B64C 39/024 |
| 9,363,690 B1* | 6/2016 | Singh | ............... | H04W 28/0289 |
| 9,467,922 B1* | 10/2016 | Buchmueller | ..... | H04B 7/18506 |
| 9,513,125 B2* | 12/2016 | Ravenscroft | ......... | G06Q 10/047 |
| 9,537,561 B1* | 1/2017 | Kotecha | .................. | H04W 8/00 |
| 9,603,158 B1* | 3/2017 | Ross | ....................... | H04W 4/40 |
| 9,866,313 B1* | 1/2018 | Murphy | ................ | H04W 16/26 |
| 9,898,932 B2* | 2/2018 | Brown | ................ | G08G 5/0086 |
| 10,020,872 B2* | 7/2018 | Murphy | ............ | H04B 7/18571 |
| 10,156,631 B2* | 12/2018 | Parker | .................... | G01S 13/86 |
| 10,187,806 B2* | 1/2019 | Priest | ................... | G05D 1/0866 |
| 10,327,151 B2* | 6/2019 | Priest | ................... | H04B 7/2606 |
| 10,389,432 B2* | 8/2019 | De Rosa | ............. | G08G 5/0039 |
| 10,536,821 B2* | 1/2020 | Yamashiro | ............ | H04M 11/00 |
| 10,674,373 B1* | 6/2020 | Lewis | ................... | H04W 24/10 |
| 10,710,710 B2* | 7/2020 | Price | .................... | G05D 1/0022 |
| 10,788,825 B2* | 9/2020 | Hashimoto | .......... | G05D 1/0061 |
| 2012/0158280 A1* | 6/2012 | Ravenscroft | ......... | G08G 5/0034 701/400 |
| 2012/0250010 A1* | 10/2012 | Hannay | ............... | G01N 21/952 356/237.1 |

(Continued)

*Primary Examiner* — Bhavesh V Amin
(74) *Attorney, Agent, or Firm* — Han Santos, PLLC

(57) ABSTRACT

Techniques for conducting drive tests with autonomous drones equipped with one or more user equipment are disclosed. At least one drone is configured with information specifying drive test parameters including a drive test schedule and a drive test route in a target geographical area. When the drone reaches the target geographical area, the user equipment collects drive test data and metrics for various drive tests such as voice quality tests, data quality tests, and video quality tests. The drone is further configured to automatically adjust its position to stay on designated drive test routes to reduce interference or collision with other drones on different drive test routes.

17 Claims, 5 Drawing Sheets

(56) References Cited

U.S. PATENT DOCUMENTS

| | | | | |
|---|---|---|---|---|
| 2012/0262708 | A1* | 10/2012 | Connolly | G05D 1/0094 |
| | | | | 356/237.2 |
| 2014/0018976 | A1* | 1/2014 | Goossen | G05D 1/0022 |
| | | | | 701/2 |
| 2015/0304869 | A1* | 10/2015 | Johnson | G08G 5/003 |
| | | | | 701/2 |
| 2016/0066326 | A1* | 3/2016 | Choi | H04W 72/0453 |
| | | | | 370/329 |
| 2016/0112839 | A1* | 4/2016 | Choi | H04W 4/80 |
| | | | | 455/41.2 |
| 2016/0269917 | A1* | 9/2016 | Hillegas, Jr. | H04W 24/02 |
| 2016/0309337 | A1* | 10/2016 | Priest | H04W 16/18 |
| 2016/0371987 | A1* | 12/2016 | Kotecha | G08G 5/0069 |
| 2017/0013478 | A1* | 1/2017 | Singh | H04W 24/02 |
| 2017/0248947 | A1* | 8/2017 | Johnson | G05D 1/102 |
| 2017/0253330 | A1* | 9/2017 | Saigh | B64C 39/024 |
| 2017/0355457 | A1* | 12/2017 | Terry | B64C 39/024 |
| 2018/0002010 | A1* | 1/2018 | Bauer | B64C 39/024 |
| 2018/0032088 | A1* | 2/2018 | van Cruyningen | G01C 11/08 |
| 2018/0157259 | A1* | 6/2018 | Myslinski | H04N 7/183 |
| 2019/0116470 | A1* | 4/2019 | Balasubramanian | H04W 4/40 |

* cited by examiner

SMART DRIVE TESTING FOR MOBILE NETWORK AND RADIO FREQUENCY VERIFICATION

BACKGROUND

Drive testing is a method of measuring and assessing the coverage, capacity, and quality of service (QoS) of a mobile radio network. Drive testing can be conducted for the purposes of network benchmarking, optimization and troubleshooting, and service quality monitoring for wireless telecommunication carriers. The technique commonly consists of using a motor vehicle outfitted with mobile radio network air interface measurement equipment that can detect and record a variety of physical and virtual parameters of a mobile cellular service in a given geographical area that is to receive a network coverage. For instance, the vehicle can be equipped with a computer having data collecting software installed thereon, a security key (e.g., a dongle), at least one user equipment (e.g., a mobile phone) that is being tested, and a Global Positioning System (GPS) antenna. The equipment are generally specialized electronic devices that interface to original equipment manufacturer (OEM) mobile handsets. This ensures measurements are realistic and comparable to actual customer experiences. By measuring what a customer (i.e., a wireless network subscriber) would experience in any specific area, wireless telecommunication carriers can make directed changes to their networks that provide a better coverage and service to their customers.

Vehicles that conduct drive testing are deployed on specific drive test routes in order to collect drive test data. In this regard, the vehicles generally remain on roads while the data test equipment collects data relating to the network itself, services running on the network such as voice or data services, radio frequency (RF) scanner information, and GPS information to provide location logging. Thus, the locations in which the data can be obtained is limited to the locations generally accessible to vehicles. As a result, wireless telecommunication carriers may encounter limitations in obtaining sufficient drive test data and finding problems experienced by their customers to diagnose root causes for network issues. Without adequate data, the process to improve the network or reallocate network resources cannot be optimized.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
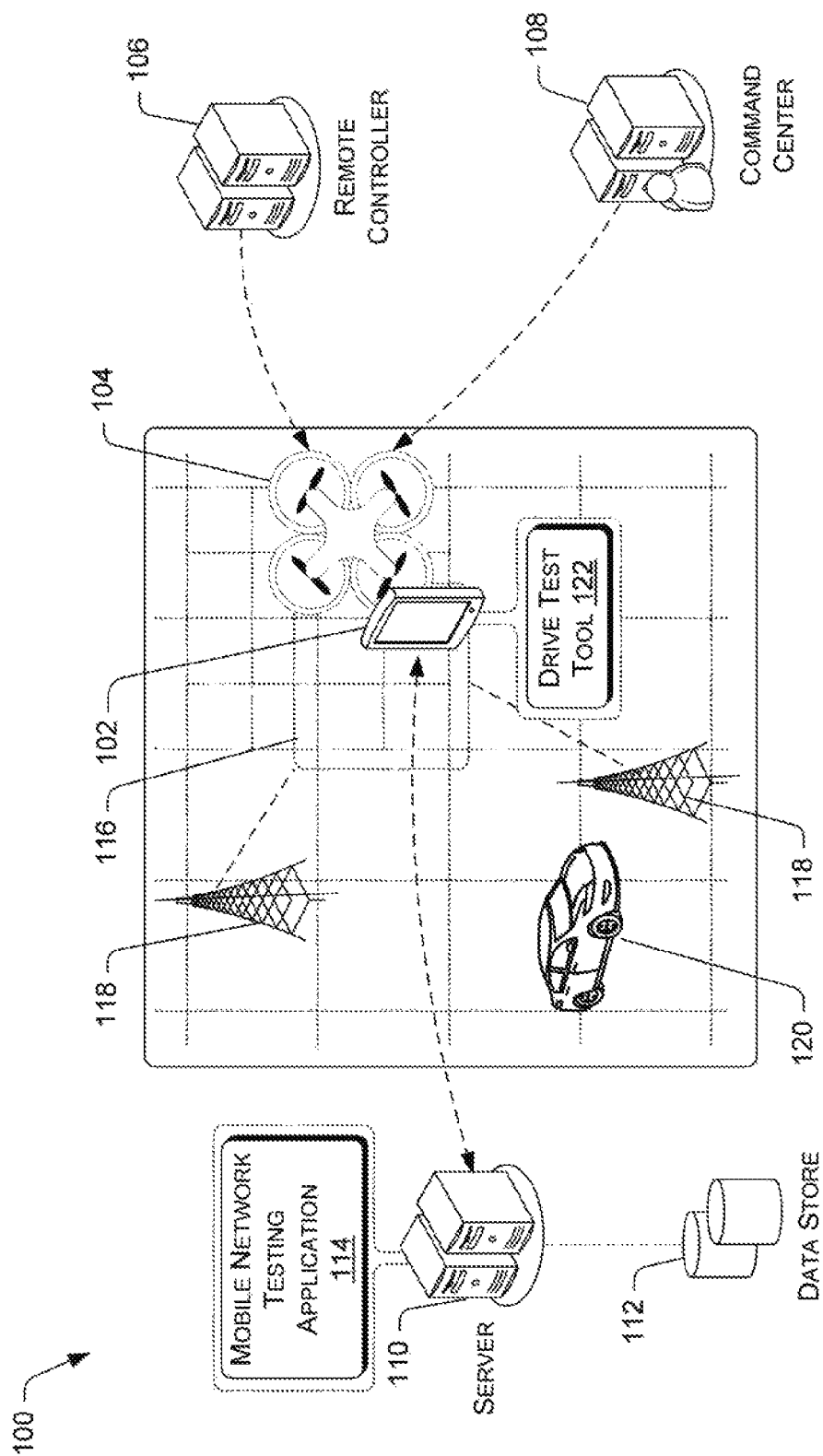
FIG. 1 illustrates example network architecture for conducting drive testing.

This disclosure is directed to techniques for conducting drive testing utilizing one or more drones or unmanned aerial vehicle (UAV) equipped with user equipment being tested. It is contemplated that the drones can be registered with the Federal Aviation Administration (FAA) or other administrative entities or agencies. In various embodiments, each drone is configured to deploy autonomously on a predefined drive test route in a geographical area on a scheduled basis. In contrast to the ground vehicles traditionally used for drive tests, the drones can travel quickly and access areas such as between buildings, pedestrian areas, narrow streets, alleys, parks, waterways, ski resorts, rural areas, and/or so forth. In this way, the drones are not limited to navigating on road systems and can travel to locations that are remote, dangerous, or difficult or impossible to be reached by people. While the drones can operate in areas not accessible by ground vehicles that are typically used for drive tests, the drones can operate in compliance with the FAA airspace restrictions as well as other applicable rules and regulations.

The drones can communicate with a remote controller on ground or with a command center in real-time or in near real-time for receiving drive test parameters such as the type of quality testing to be conducted (e.g., voice quality, data quality, video quality), data to be acquired, drive test routes, drive test schedules, target locations, and/or so forth. Additionally, one or more operators can track the location of the drones and monitor the health status of the drone in real-time or in near real-time. The operators can also add new drones, remove or replace decommissioned drones, schedule drone maintenance, and/or so forth. In various embodiments, a plurality of drones can operate concurrently in order to conduct multiple drive tests in one or more target geographical areas in which network coverage is to be provided.

Each drone is equipped with one or more user equipment having a drive test tool or an application installed thereon. The drone and the user equipment are operated on different assigned frequencies approved by the Federal Communications Commission (FCC) to avoid interference. In various embodiments, a single user equipment can conduct multiple tests in a predetermined order in a single drive testing session or over multiple drive testing sessions. Additionally, or alternatively, one or more drones can be equipped with multiple user equipment, wherein each user equipment can be dedicated to conduct specific types of tests. Without limitation, the user equipment can conduct voice quality testing, data quality testing, and/or video quality testing. In this regard, a first user equipment can conduct voice quality testing, a second user equipment can conduct data quality testing, and a third user equipment can conduct video quality testing. Additionally, or alternatively, the drone can be equipped with a mobile chip set for conducting drive testing. The voice quality testing, data quality testing, and video quality testing can be conducted concurrently over a single drive testing session. Additionally, drive testing can include uplink (UL) and downlink (DL) throughput testing, emergency services (e.g., 911 services) testing, and/or other tests to monitor, measure, and verify network parameters.

Each of the user equipment is operatively connected to a data collecting server that is configured to retrieve drive test data or cellular interface data obtained from the user equipment. In various embodiments, the drive test data can be collected and stored locally on the user equipment and then transferred to the data collecting server for post-processing. Additionally, or alternatively, the drive test data captured on the user equipment can be transferred to a processor or a memory unit of the drone locally and later collected therefrom for post-processing. The drive test data can be analyzed in order to determine problem areas and plan improvements for the cellular system. The data collected by the drive test tool can be saved as log files locally on the user equipment. The user equipment and/or the server can also be operatively connected to a data store for storing and managing drive test data.

In various embodiments, the user equipment can be accessed remotely using an application (e.g., a mobile application) installed thereon via any cellular networks and/or any other wireless network technologies to make test calls or to perform various network parameter monitoring for drive testing. In the event of any service interruption, it is contemplated that the user equipment can quickly switch back to another technology without losing connectivity from a command center or a controller. It is noted, however, that continuously accessing user equipment using the application remotely via any cellular network may utilize one or more radio resources that may not provide the actual drive testing results for certain drive testing scenarios and testing quality may need to be taken into consideration, particularly for uplink (UL) and downlink (DL) throughput testing results, latency testing results, and/or so forth. In this regard, cellular network may be utilized for remote connectivity of user equipment before and after testing to run drive testing scripts and then capture log files containing the drive test data rather than continuously in order to obtain more accurate drive testing results.

The techniques described herein may be implemented in a number of ways. Example implementations are provided below with reference to the following figures.

Example Network Architecture

FIG. 1 illustrates example architecture for conducting drive testing. The architecture may include one or more drones 104, wherein each drone 104 is equipped with one or more user equipment 102 connected to a network 100. The network 100 can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet). The network 100 may include one or more cell sites 118 or base stations in which each cell site 118 or base station provides network coverage in a geographical area 116.

The drone 104 can include UAVs that comprise respective flight control units and payload units. For example, the flight control units can include any appropriate avionics, control actuators, and/or other equipment such as motors, engines, and/or propellers to fly the drone 104. The control actuators (e.g., digital electronic speed controllers) can be operatively connected to a computing unit that is configured to interface with one or more sensors, a communication interface (e.g., transceivers), and a power source (e.g., lithium-polymer batteries). It is noted that the drone 104 as described herein can operate with more or fewer of the components described herein. Additionally, the drone 104 can include other vehicular devices, such as an unmanned vehicular device, a robotic device, and/or so forth, depending upon embodiments.

The computing unit can utilize various computing technologies such as a microcontroller, system-on-a-chip (SOC), and single-board computers (SBC). Alternatively, the computing unit can utilize a microprocessor and/or digital signal processor (DSP) with associated storage memory for executing computer instructions, controlling, and processing data. The instructions can comprise a UAV software such as flight stack or autopilot. The sensors can comprise various types of sensors for determining the state (e.g., position and movement) of the drone 104. For instance, the sensors can comprise cameras, accelerometers, magnetic sensors, current sensors, tilt sensors, GPS, barometer, altimeter, and/or so forth. Thus, the drone 104 can collect environmental data such as its location information (e.g., GPS coordinates), latitude, longitude, and/or so forth.

The drone 104 can communicate with a remote controller 106 or a ground-based controller via one or more transceivers, wherein the remote controller 106 can be operated by an operator. Additionally, or alternatively, the drone 104 can communicate with a command center 108. Various secure communication protocols may be applied, depending upon embodiments. The remote controller 106 and the command center 108 may be operated by a wireless telecommunication carrier or a third-party entity that is working with the wireless telecommunication carrier. In various embodiments, the command center 108 can include a plurality of remote controllers 106. In this regard, the command center 108 can manage one or more remote controllers 106. It is noted that the term "communicate" including variances thereof, as used herein, encompasses direct communication and indirect communication through one or more intermediary components and does not require direct physical communication and/or constant communication, but rather includes selective communication at periodic or aperiodic intervals, as well as one-time events. Each of the remote controller 106 and the command center 108 can comprise general-purpose computers, such as desktop computers, tablet computers, laptop computers, servers (e.g., on-premise servers), or other electronic devices that are capable of receiving input, processing the input, and generating output data.

The remote controller 106 and the command center 108 are configured to control or operate the drone 104 from remote locations. The remote controller 106 and the command center 108 are in communication with or operated by one or more RF engineers and/or other operators. For example, a single remote controller 106 or the command center 108 can operate a plurality of drones 104 concurrently while the drones are located in one or more target geographical areas 116. Alternatively, each of the remote controller 106 and/or the command center 108 can operate a single drone 104 in real-time or in near real-time in order to deploy the drone 104 to a target geographical area 116 to conduct drive testing. In various embodiments, the remote controller 106 and/or the command center 108 can determine drive test parameters or schemes such as when the drone 104 is deployed under normal or special conditions, where the drone 104 is deployed to under normal or special conditions, which drive tests to conduct under normal or special conditions, and/or so forth. In this way, the drone 104 can automatically deploy on one or more drive test routes and conduct various drive tests on a scheduled basis.

The remote controller 106 and/or the command center 108 can receive location signals from the drone 104 in order to determine whether the drone 104 is in the target geographical area 116. Additionally, the remote controller 106 and/or the command center 108 can monitor for location signals from the drone 104 in order to determine whether the drone 104 is on the drive test route within the target geographical area 116. The remote controller 106 and/or the command center 108 can use the location information of one drone 104 in order to deploy other drones to other drive test routes in the target geographical area 116 and to communicate with the deployed drones, for example, to recall the drones.

The drone 104 can be configured with information to navigate a specific route in the target geographical area 116 on a scheduled basis. One or more drones 104 can operate in one geographical area 116 or in adjacent geographical areas. For instance, a first drone can conduct a first drive test in a geographical area 116 and a second drone can conduct a second drive test in the geographical area 116, wherein the first drone and the second drone can conduct drive tests concurrently. In another example, a first drone can conduct drive tests in a first geographical area and a second drone can conduct drive tests in a second geographical area, wherein the first geographical area and the second geographical area can overlap at least partially in order to ensure testing coverage in both the first and second geographical areas. In this regard, the drones 104 can communicate with each other to work in conjunction with one another and to minimize interference with respective drive test sessions being conducted. In various embodiments, the drone 104 can also work in conjunction with a drive test vehicle 120 to enable the drone 104 to receive information regarding the location where the drive test vehicle 120 cannot access. The drone 104 can communicate with other drones and/or the drive test vehicle 120 using various radio interfaces. Upon receiving the location information (e.g., GPS coordinates) where the drive test vehicle 120 cannot access, the drone 104 can navigate to that location to conduct and collect drive test data therefrom in order to minimize gap in obtaining drive test data.

Additionally, one or more drones can be configured with various drive test parameters or schemes such that the drones can deploy to different drive test routes or select a drive test route in response to determining that a condition or a set of conditions is satisfied. For example, a first drone and a second drone can each be configured with a first drive test route and a second drive test route. If the first drone is conducting a drive test on the first drive test route, the second drone is configured to select the second drive test route. In this way, the first drone and the second drone can each conduct drive tests while minimizing interference and avoiding collision with one another. Thus, a condition is satisfied when another drone is detected in a target geographical location and the drone is conducting a drive test on one of the drive test routes. In another example, the first drone is configured to conduct a drive test on the first drive test route in accordance with a drive test schedule. Thus, a condition is satisfied based at least partially on time.

The drone 104 is equipped with one or more user equipment 102, wherein the user equipment 102 can be integral to the drone 104 or removably mounted to the drone 104. The user equipment 102 comprises smartphones, mobile devices, personal digital assistants (PDAs) or other electronic devices having a wireless communication function that are capable of receiving input, processing the input, and generating output data. The user equipment 102 are connected to the network 100 utilizing the one or more cell sites 118 or any other common wireless or wireline network access technologies such as base stations. In various embodiments, the user equipment 102 can be remotely operated from the ground (e.g., via a mobile application). The user equipment 102 can be operated from the command center 108 or a different command center such that the drone 104 and the user equipment 102 can each be operated from a dedicated command center. Additionally, or alternatively, the command center 108 can comprise separate nodes for managing and/or controlling the drone 104 and the user equipment 102.

The user equipment 102 can be equipped with a RF drive test tool 122 for conducting drive tests and collecting drive test data. In various embodiments, the RF drive test tool 122 can comprise a mobile application. While the user equipment 102 is conducting drive tests while mounted on the drone 104, the user equipment 102 can verify seamless handovers of various services (e.g., voice, video, data) to ensure that there is no interruption of any services while moving from one base station to another base station or moving from one section to another section of the same base station. The data set collected during drive testing field measurements can include information such as signal intensity, signal quality, interference, dropped calls, blocked calls, anomalous events, call statistics, service level statistics, quality of service information, handover information, neighboring cell information, and/or so forth.

More particularly, the user equipment 102, via the drive test tool 122, can conduct voice quality testing, data quality testing, and video quality testing. During the voice quality testing, the user equipment 102 can collect data pertaining to voice quality, call failures, call drops, delay measurements, level measurements, and received signal strength indication (RSSI). During the data quality testing, the user equipment 102 can collect data pertaining to Transmission Control Protocol (TCP), User Datagram Protocol (UDP), Voice Over Internet Protocol (VoIP), route, Hypertext Transfer Protocol (HTTP), File Transfer Protocol (FTP), Domain Name System (DNS), email, and SMS metrics. Additionally, the user equipment 102 can collect data pertaining to network and phone information, and RSSI. During the video quality testing, the user equipment 102 can collect data pertaining to video and audio quality metrics, network and phone information, and RSSI.

The user equipment 102 can transmit the collected drive test data or drive test data log files to a server 110, a data store 112, or another data collecting server. In various embodiments, the server 110 is configured to implement a mobile network testing application 114 that is configured to access the user equipment 102 remotely to collect drive test data. The mobile network testing application 114 can comprise a mobile application, a cloud based application, and/or so forth. Depending upon embodiments, the architecture can implement additional tools comprising data collecting software for measuring, benchmarking, and analyzing drive test data. In various embodiments, the architecture can also comprise a network optimization tool for performing wireless network optimization using the drive test data log files. The server 110 may include general-purpose computers, such as desktop computers, tablet computers, laptop computers, servers (e.g., on-premise servers), or other electronic devices that are capable of receiving input, processing the input, and generating output data. The server 110 may be operated by a wireless telecommunication carrier or a third-party entity that is working with the wireless telecommunication carrier. The server 110 may store data in a distributed storage system, in which data may be stored for long periods of time and replicated to guarantee reliability.

Accordingly, the server 110 may provide data and processing redundancy, in which data processing and data storage may be scaled in response to demand. In some embodiments, the server 110 is operatively connected to at least one data store 112 or a dedicated data server. The data collected by the drive test tool 122 in the form of log files can be stored in the data store 112 and assessed to evaluate the various RF parameters of the network. The data store 112 can comprise a data management layer that includes software utilities for facilitating the acquisition, processing, storing, reporting, and analysis of data from multiple data sources such as a user equipment, a drone, and/or so forth. In various embodiments, the data store 112 can interface with an application programming interface (API) for providing data access. In a networked deployment, new servers 110 may be added. Thus, the server 110 can include a plurality of physical machines that may be grouped together and presented as a single computing system. Each physical machine of the plurality of physical machines may comprise a node in a cluster. The server 110 may also be in the form of virtual machines, such as virtual engines (VE) and virtual private servers (VPS).

The mobile network testing application 114 can request and receive from the user equipment 102 drive test data (i.e., network cell condition information) for one or more geographical areas 116 at which the user equipment 102 used voice call, data, or video during a time interval. A benchmark for these QoS parameters using the drive test data can be measured and averaged over a predetermined period of time. In various embodiments, the mobile network testing application 114 can manage different drive test campaigns in order to create different benchmarks for the QoS parameters.

Although the illustrated example architecture is depicted as including one user equipment 102, one drone 104, one remote controller 106, one command center 108, one server 110, and one data store 112, the teaching of this disclosure can be used with any number of drones and user equipment controlled by any number of remote controllers 106, command centers 108, or servers 110 to conduct drive testing. For example, multiple command centers 108 can be included in the example architecture to provide redundancy to drone management according to different drive testing parameters or criteria, to segment a target geographical area 116 into multiple regions, and/or so forth.

Example Drone Components

Figure 2:
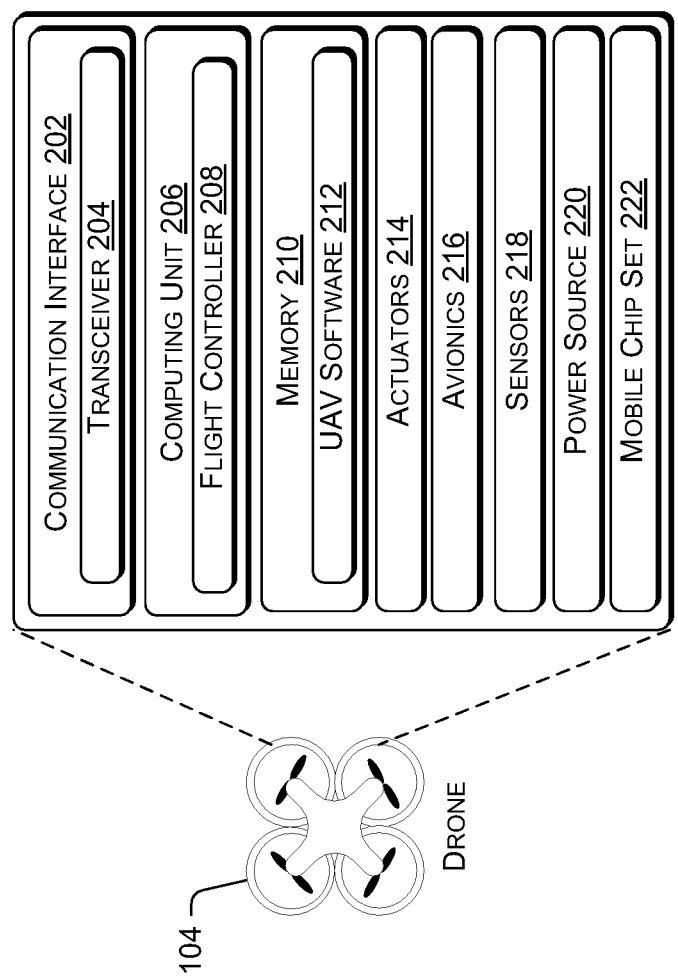
FIG. 2 is a block diagram showing various components of an example drone that implements drive testing.

FIG. 2 shows various components of an illustrative drone for conducting drive testing. The drone 104 comprises a communication interface 202 comprising one or more transceivers 204, a computing unit 206 comprising a flight controller 208, a memory 210 comprising UAV software 212 stored thereon, actuators 214, avionics 216, one or more sensors 218, and a power source 220. The power source 220 can comprise a battery bank and/or ports to charge one or more user equipment mounted thereon. The communication interface 202 can include one or more transceivers 204, wherein the transceivers 204 can include transceiver modules to implement the appropriate physical layers and protocol stacks to enable communication in the network. For example, the transceiver 204 can include an example LTE transceiver module for implementing the LTE physical layer and LTE protocol stack, 5G protocol stack, and/or any other 4G and/or 3G transceiver modules, and/or any satellite network transceiver modules, and/or so forth. For example, the transceiver 204 can receive control messages from the ground remote controller and/or the command center. The ground remote controller and/or the command center can be in communication with an RF engineer. In this way, the RF engineer can configure various factors such as the speed and location of the drone 104. More specifically, the transceiver 204 can receive commands to activate and deploy the drone 104 to a target geographical area or location. The transceiver 204 can also receive commands to deactivate and navigate back to its base location or its home station. The transceiver 204 is also configured to transmit feedback, reports, and/or other response messages to the remote controller or the command center. For example, the transceiver 204 can transmit location signals comprising a real-time location or position of the drone 104 (e.g., determined via GPS provided on the drone 104 and/or other location determination techniques). Additionally, the transceiver 204 can transmit its health status to the remote controller or the command center.

The computing unit 206 can utilize various computing technologies such as a microcontroller, system-on-a-chip (SOC), and single-board computers (SBC), as well as a processing unit with associated storage memory 210 for executing computer instructions, controlling, and processing data and operating a flight control module or other UAV software 212 such as flight stack or autopilot, wherein the processing unit can implement one or more analog or digital circuit(s), logic circuits, programmable processor(s), application specific integrated circuit(s) (ASIC(s)), programmable logic device(s) (PLD(s)), and/or field programmable logic devices (FPLD(s)).

The computing unit 206 can include a flight controller 208 to fly the drone 104. The flight controller 208 can implement control and feedback operations for interacting with appropriate equipment (e.g., actuators 214, avionics 216) to fly the drone 104. The flight controller 208 can receive commands or flight parameters from the remote controller or the command center via the transceiver 204 to configure a flight plan, deploy the drone 104, navigate the drone 104 (i.e., using the drive test routes), adjust the position of the drone 104, and/or so forth. In various embodiments, the flight controller 208 can report feedback and other information to the remote controller or the command center via the transceiver 204 to enable the remote controller or the command center to determine appropriate control commands to transmit to the drone 104. For example, upon reaching the configured target area, the drone 104, via the flight controller 208, can navigate to a starting position of a drive test route. If the drone 104 veers off course (as determined by comparing the drone's 104 monitored position and the configured drive test route), the flight controller 208 adjusts the position of the drone 104 to go back on the path of the drive test route upon receiving commands from the remote controller or the command center.

The computing unit 206 can interface with the sensors 218. The sensors 218 can comprise various sensors for determining the state (e.g., position and movement) of the drone 104. Non-limiting examples of the sensors 218 can include cameras, accelerometer, magnetic sensors, current sensors, tilt sensors, GPS, and/or so forth. The GPS can determine the real-time or near real-time location of the drone 104. In various embodiments, the sensors 218 can report feedback and other information to the remote controller or the command center via the transceiver 204.

In various embodiments, the drone 104 can comprise a mobile chipset 222 integral thereto so as to eliminate the need to mount one or more user equipment thereon. Additionally, or alternatively, the computing unit 206 can also interface with one or more user equipment that can be mounted on the drone 104. In this regard, the user equipment can include a mobile application installed thereon for interfacing with the drone 104. In various embodiments, the drive test tool that is installed on the user equipment can be configured to interface with the drone 104. The user equipment and the drone 104 can also communicate indirectly via, for example, the command center. In various embodiments, the user equipment can be integral to the drone 104. The user equipment is configured to gather drive test data for transmission to a data collecting server. In various embodiments, upon reaching a starting point of a drive test route in a target geographical area, the drone 104 can automatically transmit commands via the transceiver 204 to the user equipment to initiate one or more drive tests. Similarly, upon reaching an end point of the drive test route, the drone 104 can automatically transmit commands to the user equipment to terminate the drive tests. Additionally, or alternatively, the user equipment can automatically commence and terminate drive tests (e.g., via a script) based at least partially on the real-time location or the near real-time location of the user equipment and/or the drone 104.

More particularly, it is noted that the user equipment may comprise a GPS integral to the user equipment. The GPS of the user equipment can be implemented to enable the user equipment to commence drive testing when the user equipment determines based on the location information received from the GPS that the user equipment, and hence the drone 104, is in a target location or a target geographical area. For instance, upon determining that the drone 104 has reached a drive test route, the user equipment can automatically initiate or resume one or more drive tests (e.g., via a script). The user equipment can be in communication with the remote controller or the command center to receive drive test parameters therefrom. For example, the user equipment can receive commands to conduct specific drive tests given the location of the drone 104. Additionally, the user equipment can be in communication with one or more servers for transmitting drive test data.

Example Computing Device Components

Figure 3:
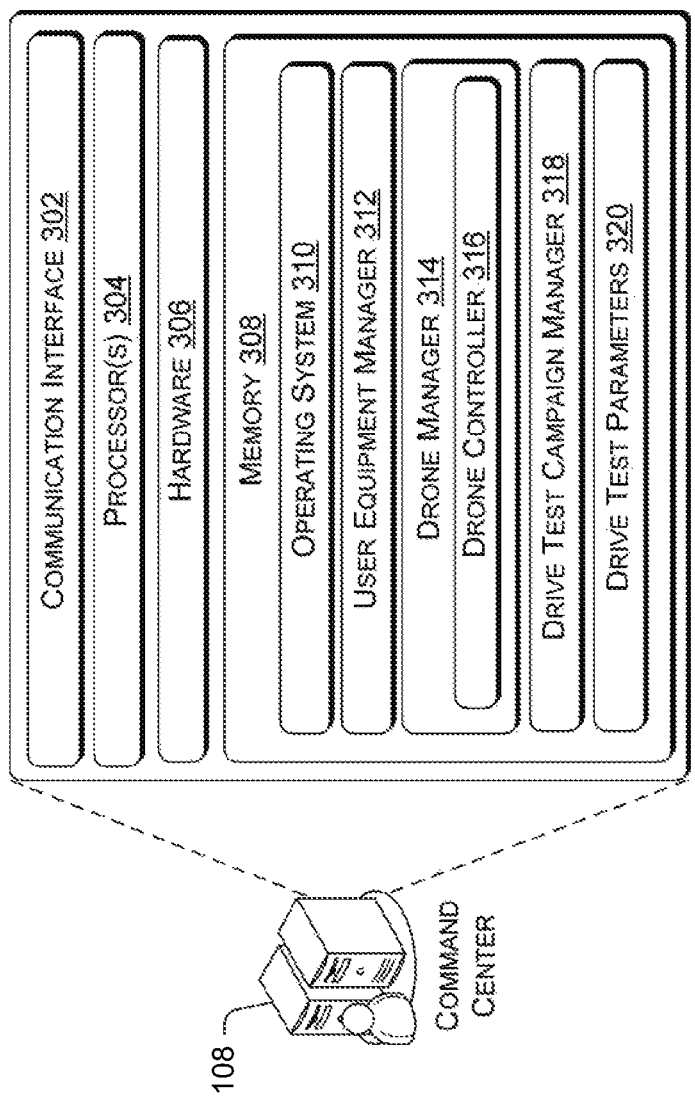
FIG. 3 is a block diagram showing various components of an illustrative command center that controls and manages drones for drive testing.

FIG. 3 is a block diagram showing various components of an illustrative computing device, wherein the computing device can comprise a command center 108. It is noted that the command center 108 as described herein can operate with more or fewer of the components shown herein. Additionally, the command center 108 as shown herein or portions thereof can serve as a representation of one or more of the computing devices or computing nodes of the present system. Further, it is noted that the command center 108 can comprise one or more remote controllers and the remote controllers can comprise one or more of the components of the command center 108 as shown herein.

The command center 108 may include a communication interface 302, one or more processor(s) 304, hardware 306, and memory 308. The communication interface 302 may include wireless and/or wired communication components that enable the command center 108 to transmit data to and receive data from other networked devices such as user equipment and drones. In at least one example, the one or more processor(s) 304 may be a central processing unit(s) (CPU), graphics processing unit(s) (GPU), or both a CPU and GPU, or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the command center 108.

The processor(s) 304 and the memory 308 of the command center 108 may implement an operating system 310, a user equipment manager 312, a drone manager 314, a drive test campaign manager 318, and drive test parameters 320. The operating system 310 may include components that enable the command center 108 to receive and transmit data via various interfaces (e.g., user controls, communication interface, and/or memory input/output devices), as well as process data using the processor(s) 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The user equipment manager 312 is configured to monitor the status of one or more user equipment mounted on the drones and configure the user equipment with one or more drive test campaigns. In various embodiments, the user equipment manager 312 can operate the user equipment in a remote manner. The user equipment managers 312 can receive status data corresponding to a device identifier for each of the user equipment. The status data can indicate whether the user equipment is conducting drive tests or on standby to conduct drive tests. Additionally, the status data can indicate whether the user equipment is connected to the network and whether the user equipment is operational to conduct drive tests. In various embodiments, the user equipment manager 312 can display a graphical user interface (GUI) such as a dashboard depicting the status of each of the user equipment.

The drone manager 314 is configured to monitor the status of one or more drones in the network. In various embodiments, the drone manager 314 can include a user interface to communicate with one or more components of the network such as the drones and/or one or more user equipment. The drone manager 314 can receive status data from one or more drones in real-time or at reporting intervals, wherein the status data corresponds to an identifier of each of the drones. In various embodiments, the drone manager 314 can provide a GUI showing a map depicting locations of each of the drones.

The drone manager 314 further comprises a drone controller 316 to control operation of one or more drones in the network, such as to deploy a drone to a target geographical area to conduct a drive testing on a drive test route. More specifically, the drone controller 316 can transmit commands to the one or more drones to navigate to a starting point of a drive test route in a target area. In another example, the drone controller 316 can transmit commands to the one or more drones to terminate drive test route and summon to its home station. Additionally, the drone controller 316 receives reporting messages from the drones, which includes one or more of the current monitored positions or locations of the drones and the drone operational status. Based on the reporting message, the drone controller 316 can transmit commands to change the location of the drones or resolve any reported issues.

The drive test campaign manager 318 is configured to monitor the status of one or more drive tests in one or more target geographical areas. For instance, the drive test campaign manager 318 can determine whether a drive test is complete, in progress, incomplete, cancelled, and/or so forth. The drive test campaign manager 318 can include a user interface for receiving a request to add new drive test campaigns, modify existing drive test campaigns, suspend or cancel existing drive test campaigns, delete existing drive test campaigns, and/or so forth. In this regard, the drive test campaign manager 318 can communicate with one or more drones and/or user equipment to configure information pertaining to drive tests. Each drive test campaign can indicate the types of tests to be conducted and the drive test routes on which the tests are to be conducted. In this regard, the drive test campaign manager 318 can interface with the drive test parameters 320 for receiving drive test parameters for each drive test campaign, wherein the drive test parameters 320 can include information such as types of drive tests to be conducted, drive test routes, target geographical areas, drive test schedules, and/or so forth.

Example Processes

Figure 4:
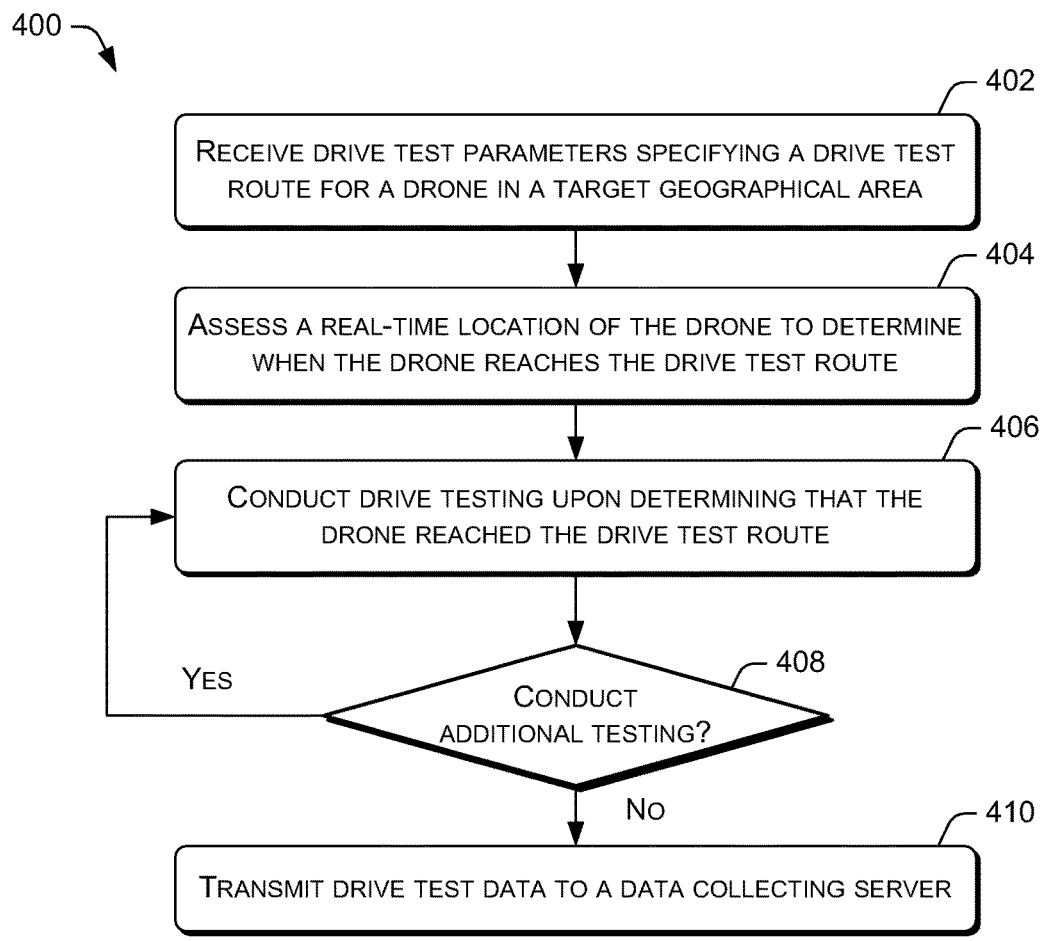
FIG. 4 is a flow diagram of an example process for conducting drive testing.
Figure 5:
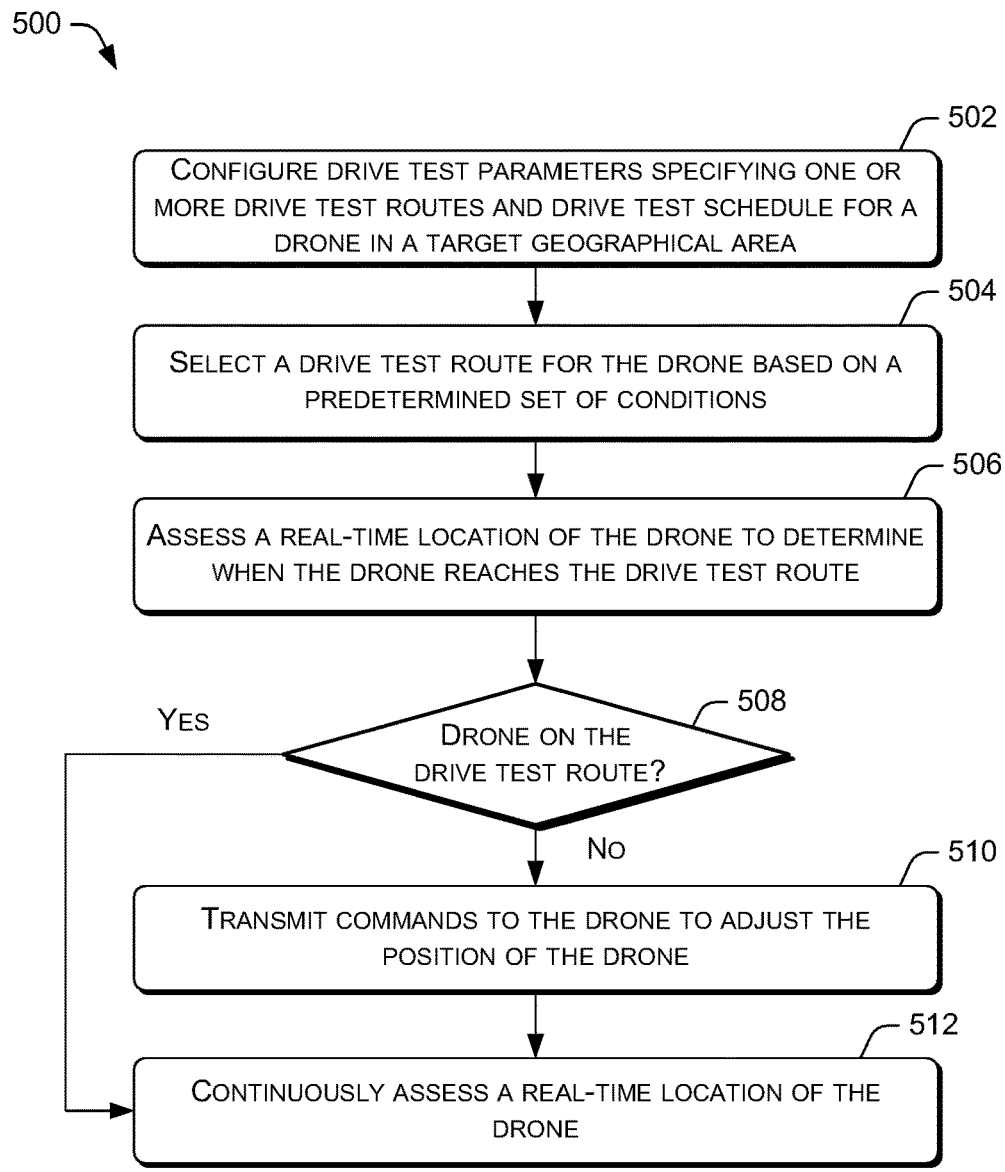
FIG. 5 is a flow diagram of an example process for selecting a drive test route and monitoring a drone during drive testing.

FIGS. 4 through 5 presents illustrative processes 400-500 for conducting drive testing. The processes 400-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to the network 100 of FIG. 1.

FIG. 4 is a flow diagram of an example process 400 for conducting drive testing using a drone provided with one or more user equipment. At block 402, the user equipment may receive drive test parameters from a command center, wherein the drive test parameters can specify a drive test route for the drone. The drone is also configured with information comprising the drive test parameters. At block 404, upon deploying the drone, the user equipment can assess a real-time location of the drone to determine when the drone reaches a starting point of the drive test route.

At block 406, upon reaching the starting point of the drive test route, the user equipment can commence drive testing, which can include voice quality testing, data quality testing, and video quality testing. Additionally, drive testing can include UL/DL throughput testing, emergency services (e.g., 911 services) testing, and/or other tests to monitor, measure, and verify network parameters. More specifically, the user equipment can conduct voice quality testing to collect voice quality data, call failures, call drops, delay measurements, level measurements, and RSSI. At decision block 408, the user equipment determines whether to conduct additional testing. If additional testing is needed ("yes" response from the decision block 408), for example, in accordance with the drive test parameters, the user equipment conducts another test. For example, the user equipment can conduct data quality testing to collect TCP, UDP, VoIP, route, HTTP, FTP, DNS, email, and SMS metrics, network and phone information, and RSSI. Additionally, or alternatively, the user equipment can conduct video quality testing to obtain video and audio quality metrics, network and phone information, and RSSI. If no additional testing is needed ("no" response from the decision block 408), the user equipment transmits drive test data to a data collection server, wherein the data collection server can consolidate data for evaluating network performance, as indicated in block 410. It is noted that if the drone comprises two or more user equipment, each user equipment can conduct a different drive test simultaneously. For example, a first user equipment can conduct a voice quality test and a second user equipment can conduct a data quality test.

FIG. 5 is a flow diagram of an example process for selecting a drive test route and monitoring the location of one or more drones on the selected drive test route. At block 502, the command center or the remote controller can configure drive test parameters specifying one or more drive test routes and a drive test schedule for one or more drones. At block 504, the command center or the remote controller can select a drive test route for the drone based on a predetermined set of conditions. For example, the command center or the remote controller can select a drive test route based at least partially on whether another drone is operating in the same target geographical area. In another example, the command center or the remote controller can select a drive test route based at least partially on the drive test schedule. In yet another example, the command center or the remote controller can select a drive test route based at least partially on the types of drive tests to be conducted.

In various embodiments, the command center or the remote controller can select multiple drive test routes and specify the order in which the drone should navigate the selected drive test routes. For example, the command center or the remote controller can select routes A and B, and then specify that the drone should navigate to route B before route A. Additionally, or alternatively, the command center or the remote controller can select routes A and B and then specify that the drone should navigate to the routes at specific times. At block 506, the command center or the remote controller can monitor for location signals from the drone in order to assess a real-time location of the drone. In this way, the command center or the remote controller can determine when the drone reaches the selected drive test route.

At decision block 508, the command center or the remote controller determines whether the drone is on the drive test route. More specifically, the command center or the remote controller compares the real-time location of the drone and the drive test route to determine whether the real-time location of the drone is on the drive test route path or course. If the drone is not on the drive test route ("no" response from the decision block 508), the command center or the remote controller transmits commands to the drone to adjust the position of the drone, as indicated in block 510. If the drone is on the drive test route ("yes" response from the decision block 508), the command center or the remote controller continues to assess a real-time location of the drone, as indicated in block 512. While on the drive test route, one or more user equipment provided on the drone can conduct voice quality testing, data quality testing, and/or video quality testing simultaneously or in a sequential order.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising: receiving information specifying one or more drive test routes in a target geographical location in which network coverage is to be provided; detecting a first drone in the target geographical location, wherein the first drone is configured with information specifying the first drive test route of the one or more drive test routes; receiving a communication from the first drone that the first drone is conducting a first drive test on the first drive test route; selecting a second drive test of the one or more drive test routes while the first drone is conducting the first drive test on the first drive test route; configuring a second drone with information specifying the second drive test route of the one or more drive test routes; conducting a second drive test in response to determining that the second drone is on the second drive test route; communicating with a drive test vehicle in the target geographical location, the drive test vehicle equipped with a user equipment that is configured to conduct the first drive test; identifying one or more areas within the target geographical location that are not accessible by the drive test vehicle; and configuring the first drone to conduct the first drive test in the one or more areas within the target geographical location.

2. The one or more non-transitory computer-readable media of claim 1, wherein the acts further include:
suspending the first drive test upon determining that the first drone is not on the first drive test route.

3. The one or more non-transitory computer-readable media of claim 2, wherein the acts further include:
resuming the first drive test in response to determining that the first drone is on the first drive test route.

4. The one or more non-transitory computer-readable media of claim 1, wherein the acts further include:
receiving information specifying an additional drive test route in the target geographical location in which the network coverage is to be provided, wherein the first drone and the second drone are configured with information specifying the additional drive test route; and
conducting an additional drive test to collect a set of drive test data for transmission to a data collecting server in response to determining that the first drone or the second drone is on the additional drive test route.

5. The one or more non-transitory computer-readable media of claim 1, wherein the first drive test route and the second drive test route at least partially overlap.

6. The one or more non-transitory computer-readable media of claim 1, wherein the one or more non-transitory computer-readable media comprises a user equipment.

7. The one or more non-transitory computer-readable media of claim 1,
wherein the first drive test and the second drive test are different.

8. A computer-implemented method, comprising: receiving information specifying one or more drive test routes in a target geographical location; detecting a first drone in the target geographical location; upon determining that the first drone is in the target geographical area, configuring, by executing one or more instructions with a processor, the first drone with the information specifying the one or more drive test routes in the target geographical area, wherein the first drone is equipped with one or more user equipment configured to conduct a drive test; receiving a communication from the first drone that the first drone is conducting a first drive test on the first drive test route; selecting a second drive test of the one or more drive test routes while the first drone is conducting the first drive test on the first drive test route; configuring a second drone with information specifying the second drive test route of the one or more drive test routes; conducting a second drive test in response to determining that the second drone is on the second drive test route; communicating with a drive test vehicle in the target geographical location, the drive test vehicle equipped with a user equipment that is configured to conduct the first drive test; identifying one or more areas within the target geographical location that are not accessible by the drive test vehicle; and configuring the first drone to conduct the first drive test in the one or more areas within the target geographical location.

9. The computer-implemented method of claim 8, further comprising the steps of:
determining a real-time location of the first drone; and
automatically adjusting, by executing the one or more instructions with the processor, a position of the first drone to maintain the first drone on the first drive test route.

10. The computer-implemented method of claim 8, wherein the one or more user equipment is configured to conduct at least one of voice quality testing, data quality testing, or video quality testing.

11. The computer-implemented method of claim 8, further comprising the steps of:
configuring, by executing the one or more instructions with the processor, the first drone with the second drive test route in the target geographical area, wherein the one or more user equipment is configured to conduct the second drive test when the first drone is on the second drive test route.

12. The computer-implemented method of claim 11, further comprising the steps of:
selecting at least one of the one or more drive test routes, wherein the one or more drive test routes is selected based on a predetermined set of conditions; and
configuring, by executing the one or more instructions with the processor, the first drone with information specifying the one or more drive test routes selected.

13. The computer-implemented method of claim 8, wherein the first drone comprises an unmanned aerial vehicle.

14. A system, comprising: one or more non-transitory storage mediums configured to provide stored computer-readable instructions, the one or more non-transitory storage mediums coupled to one or more processors, the one or more processors configured to execute the computer-readable instructions to cause the one or more processors to: receive information specifying one or more drive test routes in a target geographical location; detect a first drone in the target geographical location; upon determining that the first drone is in the target geographical area, configure the first drone with the information specifying the one or more drive test routes in the target geographical area, wherein the first drone is equipped with a user equipment configured to conduct a first drive test on a scheduled basis; receive a communication from the first drone that the first drone is conducting a first drive test on the first drive test route; select a second drive test of the one or more drive test routes while the first drone is conducting the first drive test on the first drive test route; configure a second drone with information specifying the second drive test route of the one or more drive test routes; conduct a second drive test in response to determining that the second drone is on the second drive test route; communicate with a drive test vehicle in the target geographical location, the drive test vehicle equipped with a user equipment that is configured to conduct the first drive test; identify one or more areas within the target geographical location that are not accessible by the drive test vehicle; and configure the first drone to conduct the first drive test in the one or more areas within the target geographical location.

15. The system of claim 14, wherein the one or more processors is further configured to:
   determine that the first drone failed to complete the first drive test on the first drive test route;
   configure the second drone with the information specifying the first drive test route;
   conduct the first drive test in response to determining that the second drone is on the first drive test route.

16. The system of claim 14, wherein the first drive test route is different from the second drive test route.

17. The system of claim 14, wherein the first drive test is different from the second drive test.

* * * * *